(No Model.) 3 Sheets—Sheet 1.
W. H. FULLER.
PHOTOGRAPHIC CAMERA.
No. 466,338. Patented Jan. 5, 1892.
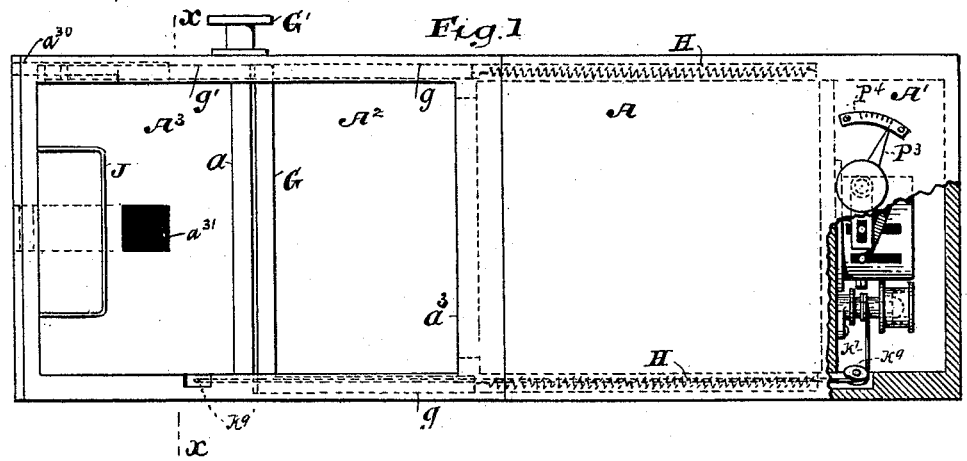
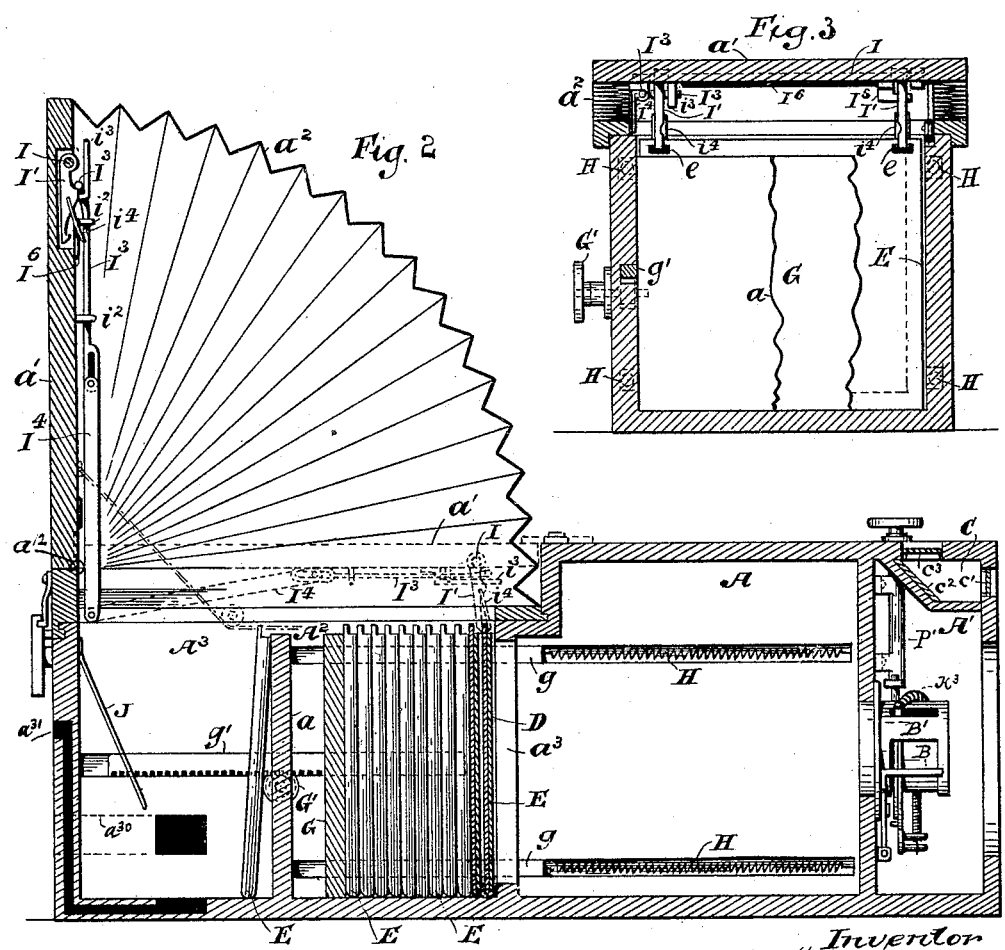
Witnesses
Wm. H. C. Robinson
C. R. Ferguson
Inventor
Willard H. Fuller
by his Attorneys
Gifford & Brown (No Model.) 3 Sheets—Sheet 2.

W. H. FULLER.
PHOTOGRAPHIC CAMERA.

No. 466,338. Patented Jan. 5, 1892.

Witnesses
Wm. H. Robinson
C. R. Ferguson

Inventor
Willard H. Fuller.
By his attorneys.
Gifford Brown (No Model.) 3 Sheets—Sheet 3.

W. H. FULLER.
PHOTOGRAPHIC CAMERA.

No. 466,338. Patented Jan. 5, 1892.

Witnesses
Wm. H. Robinson
C. R. Ferguson

Inventor
Willard H. Fuller,
by his Attorneys,
Gifford & Brown

UNITED STATES PATENT OFFICE.

WILLARD H. FULLER, OF PASSAIC, NEW JERSEY, ASSIGNOR TO THE SCOVILL & ADAMS COMPANY, OF NEW YORK, N. Y.

PHOTOGRAPHIC CAMERA.

SPECIFICATION forming part of Letters Patent No. 466,338, dated January 5, 1892.

Application filed February 23, 1889. Serial No. 300,895. (No model.)

*To all whom it may concern:*

Be it known that I, WILLARD H. FULLER, of Passaic, in the county of Passaic and State of New Jersey, have invented a certain new and useful Improvement in Photographic Cameras, of which the following is a specification.

My present improvement is specially adapted for use in photographic cameras wherein a number of sensitized plates are employed for successive use. It is specially designed for the use of plates of celluloid or analogous material.

I will describe a camera embodying my improvement, and then point out the novel features in claims.

Figure 4:
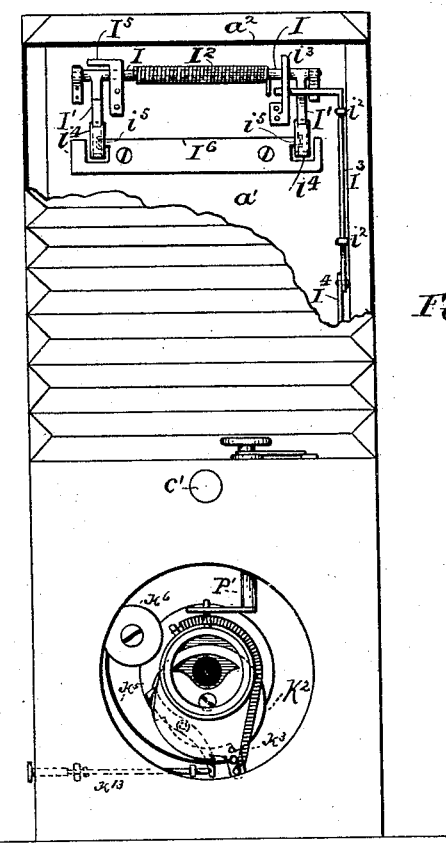
Figures 5, 6:
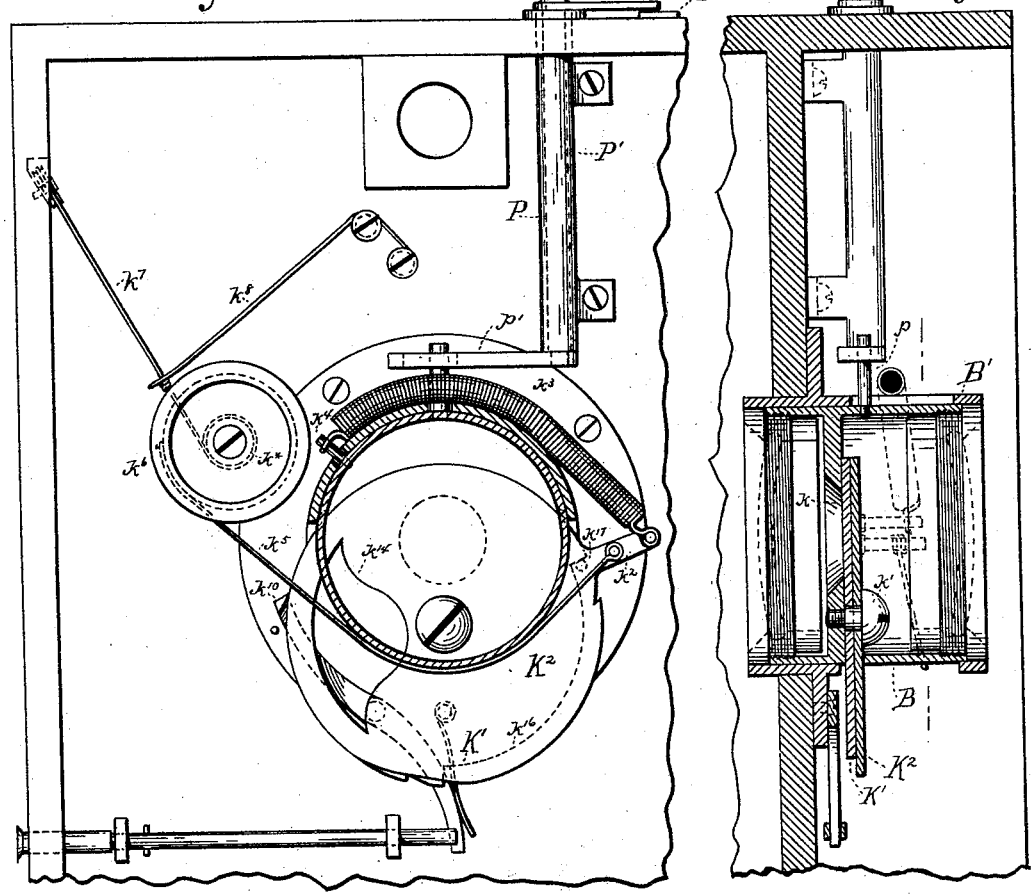
Figure 7:
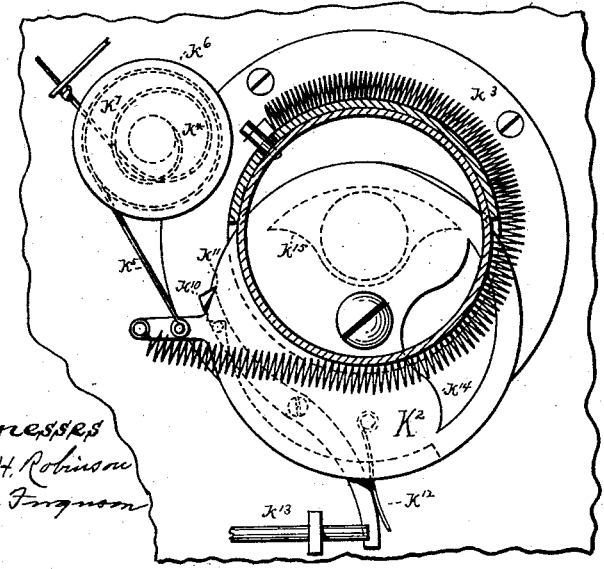

In the accompanying drawings, Figure 1 is a plan or top view of a camera embodying my improvement, certain parts being removed and certain other parts being shown in section. Fig. 2 is a central longitudinal section of this camera. Fig. 3 is a transverse vertical section taken at the plane of the dotted line $xx$, Fig. 1, looking toward the front of the camera. Fig. 4 is a front view of the camera with certain parts in section. Fig. 5 is a longitudinal section of the front end portion of the camera, the section being taken through the axis of the lens-tube. Fig. 6 is a front view of the forward end portion of the camera, the front end plate or piece being removed. Fig. 7 is a view similar to Fig. 6, showing certain parts in a different position. It will be understood that Figs. 5, 6, and 7 are on an enlarged scale.

Similar letters of reference designate corresponding parts in all the figures.

A designates the main portion or dark-chamber of the camera. Forward of this chamber is a chamber A', in which the lens-tube B and shutter mechanism coacting therewith are located. In this chamber A', I have also shown a finder-camera C. It may be of any suitable construction, and is here shown as consisting of a lens $c'$, an inclined mirror $c^2$, and a horizontally-arranged ground glass $c^3$. Rearward of the compartment A are compartments $A^2$ $A^3$. All these compartments may be made together, so as to form a single case or box. The compartments $A^2$ $A^3$ are separated by a partition $a$. It will be seen that the compartment $A^3$ is rearward of the compartment $A^2$. Both the compartments $A^2$ $A^3$ have combined with them a single cover $a'$. This is hinged in place at one end—in the present instance at the rear end—by means of hinges $a^{12}$, and at the sides and front end is connected to a bellows-like flexible covering $a^2$. This covering $a^2$ is also connected to the side walls of the compartments $A^2$ $A^3$ and is connected to the front portion thereof.

The covering $a^2$ is made of any suitable light-excluding material. The combination of this covering and the cover $a'$ with the compartments $A^2$ $A^3$ is such that the cover $a'$ may be raised into an upright position without admitting any light into either of the compartments $A^2$ $A^3$.

In order to allow of the passage of air to and from the compartments $A^2$ $A^3$ with sufficient freedom to enable the cover $a'$ to be raised and lowered without material resistance, I provide the walls of the compartments with circuits or passages $a^{30}$ $a^{31}$. It will be seen that the passage $a^{31}$ opens at the rear end wall of the compartment $A^3$, that it extends thence downwardly through this end wall to the bottom, thence along the bottom, and that it opens into the interior of the compartment $A^3$. There may be two of the passages $a^{30}$, one in each side wall of the compartment $A^3$. As these passages are circuitous, light will not be admitted through them into the compartment.

In the compartment $A^2$ a number of sensitized plates D are used. They are of rectangular form, as may be understood by reference to Fig. 3. These plates are of celluloid or analogous material sensitized in any suitable manner. They may be severally arranged in holders of any suitable kind. As shown, each is arranged in a holder E, which is open at the front, but which has a solid back and has the bottom and side edges turned over to receive within them the edges of a plate D.

Each of the holders E has in the upper part slots $e$. These are located above the corresponding plate D, which fits in such holder. These slots $e$ are intended to be engaged by hooks, whereby the holders, with the plates in them, may be one at a time picked up from one part of the camera to be moved into another part.

It will be seen that a number of the holders E, containing plates D, are arranged in the compartment A², one behind the other. They are pushed forward toward the compartment A of the camera by a pusher or follower G, located in the compartment A². This follower may be made of a rectangular piece of wood fitting snugly in the compartment A² and guided therein by arms or ribs $g$, fitting in grooves in the sides of the camera. Springs combined with this pusher propel it forward. In the present instance I employ springs H, arranged in grooves in the sides of the camera and connected at one end to the ends of the grooves near the front of the camera and at the other end to the arms $g$. I have shown the follower G as also provided with an arm $g'$, having teeth arranged thereupon in the form of a rack. This arm fits in a groove in the side of the camera and engages with a pinion upon a shaft $g'$. The shaft $g'$ extends to the exterior of the camera and may be rotated from the outside for the purpose of moving the follower against the resistance of the springs.

The follower or pusher G moves the plate-holders with their contained plates forwardly toward an opening $a^3$, with which the forward end of the compartment A² is provided. The front plate is exposed to rays of light entering the compartment A, and hence is in position for photographing.

By the raising of the cover $a'$ the front plate-holder with its plate may be picked up out of the compartment A² and deposited in the rear compartment A³. When this is done, the plate-holders with their plates remaining in the compartment A² will be moved forward by the follower or pusher. Obviously each plate-holder, after the exposure of its plate, may be removed from the compartment A² and placed in the compartment A³. It follows, therefore, that a number of plate-holders with their plates may be arranged in the compartment A², and after the exposure of each plate may be successively removed from the compartment A² into the compartment A³ without exposing the same to the light during the transit from the compartment A² to the compartment A³. The compartment A² is a holder for plates before photographing, and the compartment A³ is a holder for plates which have been exposed or photographed.

I will now explain the means which I have in the present instance combined with the cover $a'$ to effect the transfer of the plate-holders with their plates from the compartment A² to the compartment A³.

I designates a rock-shaft, here shown as arranged in a recess provided in the inner side of the cover $a'$, on this shaft are affixed arms I', here shown as two in number. The inner side of the cover is provided with recesses, into which these arms may recede when the shaft I is rocked into one extreme position. They are shown as having receded into these recesses, where they are represented in bold lines in Fig. 2. When the rock-shaft is in its other extreme position, these arms I' will occupy a position approximately at right angles to the cover $a'$, as indicated by the dotted lines in Fig. 2. The rock-shaft springs into such position as to move the arms into a position at right angles to the cover when the cover is moved downwardly into the position indicated by dotted outlines in Fig. 2, and when the cover is moved upwardly into the position in which it is shown in bold outlines in Fig. 2 the rock-shaft will move into such position as to move the arms within their recesses in the inner side of the cover. Combined with the rock-shaft is a spring, which tends to oscillate it in such direction and to such extent as to move the arms into the position at right angles to the cover. This spring is in the present instance shown as a spiral spring I², coiled around the shaft. It is prevented from moving the rock-shaft any further than this by means of a stop I⁵, consisting of a hook-shaped piece so arranged that one of the arms I' will come in contact with it when the rock-shaft has been adjusted far enough to move the arms into the position at right angles to the cover $a'$. One of the arms I' has its forward or front edge curved, so as to be more protuberant about midway between the ends than at the ends. A sliding rod I³, supported in bearings $i^2$ $i^2$, connected to the inner side of the cover, has its forward or outer end bent transversely to bear against the curved front of the arm referred to. The transversely-bent end of this rod fits behind an arm $i^3$, attached to the inner side of the cover. When this rod I³ is slid outwardly or toward the front edge of the cover $a'$, it will move nearer to the rock-shaft I, upon which the arms I' are affixed, and the spring I² will then be allowed to act so as to move the rock-shaft in a direction to adjust the arms into a position at right angles to the cover. The sliding rod I³ is connected to a rod I⁴, which is pivoted to the upper part of the compartment A³. The connection between the rod I⁴ and the rod I³ consists of a longitudinal slot in the rod I³ and a pin in the rod I⁴. When the cover $a'$ is moved downwardly, the rod I⁴ will move the rod I³ outwardly, whereupon the spring I² will oscillate the rock-shaft so that it will adjust the arms into a position at right angles to the cover $a'$. This will be done gradually. When the cover $a'$ is raised, the sliding rod I³ will be drawn inwardly, or toward the rear edge of the cover $a'$. Owing to this its transversely-extended end will move along the front edge of the contiguous arm I', and, operating upon the more protuberant middle portion, will force the arm, and with it the rock-shaft and the other arm I', back into the other extreme position.

The lower ends of the arms I' are provided with hooks. These hooks extend forwardly.

Each arm has combined with its hook a gripper $i^4$, consisting of a spring inserted in the arm and extending in front of its hook.

When the cover $a'$ is moved downwardly and the arms I' are consequently adjusted into a position at right angles thereto, the lower ends of the arms will slide behind the forward or first plate-holder and the hooks will engage with the slots $e$ thereof. The ends of the hooks are forwardly rounded, so that the hooks may be forced backward behind the plate-holder. The lower ends of their grippers $i^4$ extend slightly beyond the hooks. Hence when the hooks descend behind the front plate-holder the grippers will be in front of the upper edge of the plate-holder. When the hooks, after the descent of the arms, come opposite the slots $e$ in the forward plate-holder, the arms move slightly forward under the influence of the spring $I^2$, so that the hooks will enter the slots. The grippers will then extend over the forward extremities of the hooks and prevent the plate-holder from slipping off them. When the cover $a'$ is raised, the forward plate-holder will be carried up with it, and by the oscillation or swinging of the arms I' into their recesses the plate-holder will be disengaged from the hooks and will drop into the compartment $A^3$.

I have shown combined with the cover $a'$ a gripper-opener, whose function it is to separate the grippers from the hooks when the arms recede into their recesses in the cover $a'$. This opener consists of a plate $I^6$, secured to the inner side of the cover $a'$ adjacent to the recesses for the arms I'. This plate has slots near the end. These slots extend through the forward or upper edge of the plate. At this edge of the plate they are narrower than they are a short distance behind. Owing to this lugs $i^5$ are formed. The inner or adjacent sides of the two arms are notched, so that they may pass by the lugs $i^5$ without being engaged by the said lugs; but when the grippers come in contact with these lugs $i^5$ they will be prevented from moving further with the arms I' toward the recesses provided for said arms in the side of the cover $a'$, and hence the hooks and the grippers will be separated to disengage the plate-holder. The complete disengagement of the hooks from the plate-holder will be effected by reason of the receding of the arms which are provided with the hooks into the recesses in the cover, because the plate-holder cannot follow them into said recesses.

When a plate-holder drops from the hooked arms I', it will fall upon a guide J, arranged at the rear of the compartment $A^3$, here shown as consisting of a downwardly and forwardly extending wire frame. As the lower edge of the plate-holder will strike this first, the plate-holder, in descending, will be given a forward incline at the lower edge. This will tend to direct it forwardly in the compartment $A^3$.

The lens-tube B is fitted in a cylindric holder B' and is free to slide longitudinally therein. It has a pin $p$ fastened to it. This pin extends upwardly through a slot which is made lengthwise in the upper part of the holder B'. An arm $p'$, which is affixed to one end of a rock-shaft P, is provided with a longitudinal slot, into which the pin $p$ projects. The shaft P is supported in a bearing P', affixed to the front portion of the camera. Above the camera-case the shaft P is provided with a hand-piece $P^2$ and an index-finger $P^3$. The index-finger extends over a plate $E^4$, which may be marked with a series of lines to indicate the position into which the lens-tube B should be adjusted to adapt the camera for photographing an object at any particular distance at which the object may be distant. By turning the rock-shaft P its arm $p'$, acting through the pin $p$, will adjust the lens-tube within its holder. It will be observed that the lens-tube has extending across it between the ends a diaphragm $k$, provided with a central opening. It is through this opening that the rays of light enter the camera for photographing. Combined with this diaphragm $k$ are plates K' $K^2$. These are pivoted at the center by a pin or screw $k'$ to the diaphragm $k$ of the lens-tube; but they are thus pivoted eccentrically to the axis of the lens-tube. Owing to their eccentricity they extend through a slot in the lens-tube and the holder B', so as to be cut away for quite a distance longitudinally as well as circumferentially to avoid interfering with the travel of these plates through it when the lens-tube is adjusted.

The plates K' $K^2$ can rotate independently upon their pivot-pins. The plate $K^2$ is provided with an arm $k^2$. This is connected to a spring $k^3$, that extends around the holder B' and is fastened to a pin $k^4$, which is secured to the lens-tube and passes through a slot formed longitudinally in the holder, so that the pin can travel through the holder when the lens-tube is moved lengthwise thereof. The spring $k^3$ imparts motion to the plate $K^2$ in one direction. The arm $k^2$ has also connected to it a strap or cord $k^5$. This passes around the lens-tube and is attached to a pulley $k^6$. This pulley has secured to it another pulley $k^*$, upon which a strap $k^7$ is wound and connected. A spring $k^8$ is fastened to the strap or cord $k^7$. The strap or cord $k^7$ extends around suitable guide-pulleys $k^9$ and is fastened to the cover $a'$. It does not extend outside of the camera-body, and hence does not afford any opportunity for the passage of light into the camera. It will be seen that the strap or cord $k^5$ passes in the reverse direction from the spring $k^3$, and hence tends to move the plates $K^2$ in the opposite direction to that in which it will be moved by the spring $k^3$. When the cover $a'$ is raised, the pulleys $k^6$ $k^*$ will be rotated, and this will cause the rotation of the plate $K^2$ against the resistance of the spring $k^3$. When the plate $K^2$ has been moved as far as possible in this direction, a detent-lever $k^{10}$ will engage with a notch $k^{11}$, formed in the edge or circumference of the plate, and the plate will then be prevented from returning until such time as the detent-lever shall be disengaged from it. A spring $k^{12}$ actuates the detent-lever to engage with the notch. A pin $k^{13}$, extending to the outside of the camera-body, serves as a means for moving the detent-lever in the reverse direction to disengage it from the notch. If the cover $a'$ is shut down immediately after having set the plate $K^2$, the strap or cord $k^7$ will not be liable to run off the guide-pulleys $k^9$, because the spring $k^8$ will pull it forward and take up the slack, leaving enough slack between the spring and the pulley $k$. Whenever the detent-lever is disengaged from the plate $K^2$, the latter will be returned to its original position by the spring $k^3$. The plate $K^2$ has an opening $k^{14}$. When the plate is rotated, this opening $k^{14}$ will be moved past the opening in the diaphragm $k$ of the lens-tube.

Having now fully described the plate $K^2$ and its appurtenances, I will explain the plate $K'$. This plate is not connected to move in unison with the plate $K^2$. This plate $K'$ has an opening $k^{15}$, like the opening $k^{14}$ of the plate $K^2$, and this opening $k^{15}$ moves past the opening in the diaphragm $k$ of the lens-tube whenever the plate $K'$ is rotated. The plate $K'$ has no motion except what is given to it by the plate $K^2$. The plate $K'$ has in its edge or circumference a long notch $k^{16}$, and the plate $K^2$ has a pin $k^{17}$ extending rearwardly into the notch $k^{16}$ of the plate $K'$. When the plate $K^2$ is moved in the direction which the strap $k^5$ gives to it, such plate will not impart any motion to the plate $K^2$ until it has rotated a considerable distance and by so doing has caused its pin $k^{17}$ to contact through one end of the notch $k^{16}$ in the plate $K'$. This operation is important in that it insures the opening $k^{14}$ of the plate $K^2$ being out of line with the opening $k^{15}$ of the plate $K'$ before the plate $K^2$ imparts any motion to the plate $K'$. After this first motion of the plate $K^2$ its further motion imparts a like motion to the plate $K'$ until the detent engages with the plate $K^2$ and holds it. Owing to this independent motion of the two plates, insuring the adjustment of their two openings out of line, the shutter, which is composed of the two plates, may be set without admitting any light into the camera. When the detent-lever is disengaged, the plate $K^2$ moves, under the influence of the spring $k^3$, along until its pin $k^{17}$ reaches the other end of the notch $k^{16}$ in the plate $K'$. By this time the opening $k^{14}$ of the plate $K^2$ is in line with the opening $k^{15}$ of the plate $K'$. The continued movement of the plate $K^2$ under the influence of the spring $k^3$ will be participated in by the plate $K'$, and the two plates will then move with their openings $k^{14}$ $k^{15}$ in line past the opening in the diaphragm $k$ of the lens-tube. Owing to this the rays of light will be admitted, as in the case of an ordinary shutter. This shutter, which can be set without admitting any rays of light, is important in connection with a camera wherein plate-holders and plates are shifted from one place to another and one plate is always left exposed to any rays of light which might enter the lens-tube, because it protects the exposed plate during the setting of the shutter.

What I claim as my invention, and desire to secure by Letters Patent, is—

1. The combination, with a photographic camera, of a compartment wherein a plate may be exposed, a movable part arranged above said compartment and forming a cover therefor, and mechanism connected with said movable part for removing a plate-holder after exposure, substantially as specified.

2. The combination, with a photographic camera, of a compartment wherein a plate may be exposed, a movable part arranged above said compartment and forming a cover therefor, a flexible covering extending between the said compartment and the said movable part, and mechanism combined with said movable part for removing a plate-holder after exposure, substantially as specified.

3. The combination, with a photographic camera, of a compartment wherein a plate may be exposed, a movable part arranged above said compartment and forming a cover therefor, a flexible covering extending between the said compartment and the said movable part, hooks carried by the said movable part, and mechanism for oscillating said hooks upon the movement of the said movable part, substantially as specified.

4. The combination, with a photographic camera, of a compartment wherein a plate may be exposed, a movable part arranged above said compartment and forming a cover therefor, a flexible covering extending between the said compartment and the said movable part, hooks carried by the said movable part, and mechanism comprising a sliding rod operated by the movement of the movable part and causing the oscillation of the hooks, substantially as specified.

5. The combination, with a photographic camera, of a compartment wherein a plate may be exposed, a movable part arranged above said compartment and forming a cover therefor, a flexible covering extending between the said compartment and the said movable part, hooks carried by the said movable part, a rock-shaft upon which the hooks are mounted, a spring applied to said rock-shaft, and a sliding rod operated by the movement of the movable part and causing the oscillation of the hooks, substantially as specified.

6. The combination, with a photographic camera, of a compartment wherein a plate may be exposed, a movable part arranged above said compartment and forming a cover therefor, a flexible covering extending between the said compartment and the said movable part, hooks carried by the said movable part, mechanism for oscillating the hooks upon the movement of the said movable part, grippers combined with the hooks, and an opener for the grippers, substantially as specified.

7. The combination, with a photographic camera, of a compartment wherein a plate may be exposed, a movable part arranged above said compartment and forming a cover therefor, a flexible covering extending between the said compartment and the said movable part, hooks carried by the said movable part, a rock-shaft upon which the hooks are mounted, a spring applied to said rock-shaft, a sliding rod operated by the movement of the movable part and causing the oscillation of the hooks, grippers combined with the hooks, and an opener for said grippers, substantially as specified.

8. The combination, with a photographic camera, of a compartment for plates to be exposed, a follower or pusher for moving said plates forward, a movable part arranged above said compartment and forming a cover therefor, and mechanism combined with said movable part for removing a plate-holder after exposure, substantially as specified.

9. The combination, with a photographic camera, of a compartment for plates to be exposed, a follower or pusher for moving said plates forward, a movable part arranged above said compartment and forming a cover therefor, mechanism combined with said movable part for removing the plate-holder after exposure, and a guide for directing a descending plate-holder forwardly, substantially as specified.

10. The combination, with a photographic camera, of a movable part forming a cover for a portion of the camera, the walls of the camera having circuits or inlets for the passage of air or the admission of light during the operation of the movable part, substantially as specified.

11. The combination, with a photographic camera, of a compartment wherein a plate is exposed, a movable part comprising a cover for a portion of the camera, and a shutter having two plates, each provided with an opening and moved independently, so that in rotating one way their openings will be out of line and in rotating the other way their openings will be in line, the said shutter operated by the movable part, substantially as specified.

12. The combination, with a photographic camera, of a compartment wherein a plate is exposed, a movable part arranged above said compartment and forming a cover therefor, mechanism combined with said movable part for removing a plate-holder after exposure, a shutter having two plates, each provided with an opening and moved independently, so that in rotating one way their openings will be out of line and in rotating the other way their openings will be in line, and a connection between said shutter and the movable part, located above the compartment in which the plates are exposed, substantially as specified.

13. The combination, with a photographic camera, of a movable part comprising a cover for a portion of the camera, a shutter composed of two plates pivoted to rotate independently, each provided with an opening, and mechanism, substantially such as described, whereby they will move independently, substantially as specified.

14. The combination, in a photographic camera, of a number of independent plates, a compartment or receptacle within the camera-case for holding said plates to be exposed, a device wholly within the camera-case adapted to engage with the upper edge of a plate for shifting it, a portion of the camera-case constructed so as to be free to move up and down for operating the shifting device, and a receptacle in the rear of the first-named compartment or receptacle, into which the plates may be shifted, said receptacle being constructed to be capable of holding all of said plates, substantially as specified.

WILLARD H. FULLER.

Witnesses:
 JAMES S. GREVES,
 WILLIAM H. ROBINSON.